(12) United States Patent
Zhi et al.

(10) Patent No.: US 10,692,650 B2
(45) Date of Patent: Jun. 23, 2020

(54) THREE-PHASE TRANSFORMER

(71) Applicant: FANUC CORPORATION, Yamanashi (JP)

(72) Inventors: Chao Zhi, Yamanashi (JP); Takuya Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 53 days.

(21) Appl. No.: 16/127,790

(22) Filed: Sep. 11, 2018

(65) Prior Publication Data
US 2019/0088411 A1   Mar. 21, 2019

(30) Foreign Application Priority Data

Sep. 15, 2017   (JP) .................................. 2017-178296

(51) Int. Cl.
*H01F 30/12* (2006.01)
*H01F 3/10* (2006.01)
(Continued)

(52) U.S. Cl.
CPC ............... *H01F 30/12* (2013.01); *H01F 3/10* (2013.01); *H01F 27/263* (2013.01);
(Continued)

(58) Field of Classification Search
CPC ...... H02M 3/24; H01F 27/263; H01F 27/306; H01F 27/12; H01F 27/321; H01F 27/24;
(Continued)

(56) References Cited

U.S. PATENT DOCUMENTS 7,148,782 B2 * 12/2006 Hirzel ..................... H01F 27/25
336/212
10,256,737 B2 * 4/2019 Yang ......................... H02J 7/00
(Continued)

FOREIGN PATENT DOCUMENTS

CN         105529166 A     4/2016
CN         107017082 A     8/2017
(Continued)

OTHER PUBLICATIONS

English Abstract and Machine Translation for Chinese Publication No. 107017082 A, published Aug. 4, 2017, 16 pgs.
(Continued)

*Primary Examiner* — Mang Tin Bik Lian
(74) *Attorney, Agent, or Firm* — Fredikson & Byron, P.A.

(57) ABSTRACT

A three-phase transformer according to an embodiment includes a first plate iron core and a second plate iron core disposed opposite each other; a plurality of columnar iron cores disposed between the first plate iron core and the second plate iron core so as to be connected to the first plate iron core or the second plate iron core, the number of the columnar iron cores being an integer multiple of 3, the columnar iron cores being disposed rotation-symmetrically with respect to an axis equidistant from central axes of the columnar iron cores; and coils including a plurality of primary coils and a plurality of secondary coils, the number of the primary coils being an integer multiple of 3, the number of the secondary coils being an integer multiple of 3, the primary coils and the secondary coils being wound on the individual columnar iron cores.

10 Claims, 18 Drawing Sheets

(51) Int. Cl.
*H01F 27/26* (2006.01)
*H01F 27/30* (2006.01)
*H02M 3/24* (2006.01)
*H01F 27/12* (2006.01)
*H01F 27/32* (2006.01)
*H01F 3/14* (2006.01)

(52) U.S. Cl.
CPC ............ *H01F 27/306* (2013.01); *H02M 3/24* (2013.01); *H01F 3/14* (2013.01); *H01F 27/12* (2013.01); *H01F 27/321* (2013.01); *H01F 2003/106* (2013.01)

(58) Field of Classification Search
CPC ... H01F 27/25; H01F 3/14; H01F 3/10; H01F 2003/106
USPC .... 336/5, 212, 170, 184, 213, 214, 215, 221
See application file for complete search history.

(56) References Cited

U.S. PATENT DOCUMENTS

| | | | | |
|---|---|---|---|---|
| 2003/0112111 A1* | 6/2003 | Bolotinsky | ............. | H01F 27/25 336/170 |
| 2014/0268896 A1* | 9/2014 | Kurita | .................... | H01F 37/00 363/17 |
| 2014/0292455 A1* | 10/2014 | Kurita | ....................... | H01F 3/14 336/5 |
| 2015/0179330 A1* | 6/2015 | Nakanoue | ............... | H01F 37/00 336/5 |

FOREIGN PATENT DOCUMENTS

| | | | |
|---|---|---|---|
| CN | 109256266 | A | 1/2019 |
| JP | 481343 | Y | 1/1973 |
| JP | 4892872 | A | 12/1973 |
| JP | 605105 | U | 1/1985 |
| JP | 8167527 | A | 6/1996 |
| JP | 9159614 | A | 6/1997 |
| JP | 10223454 | A | 8/1998 |
| JP | 118138 | A | 1/1999 |
| JP | 2003229315 | A | 8/2003 |
| JP | 2011250529 | A | 12/2011 |
| JP | 2012222083 | A | 11/2012 |
| JP | 2013115407 | A | 6/2013 |
| JP | 2014220435 | A | 11/2014 |
| JP | 201648741 | A | 4/2016 |
| JP | 201658513 | A | 4/2016 |
| WO | 2012137494 | A1 | 10/2012 |
| WO | 2012157053 | A1 | 11/2012 |
| WO | WO-2014033830 A1 * | 3/2014 | ............. H02J 3/382 |

OTHER PUBLICATIONS

English Machine Translation for International Patent Application Publication No. 2012157053 A1, published Nov. 22, 2012, 12 pgs.
English Abstract and Machine Translation for Japanese Publication No. 2014-220435 A, published Nov. 20, 2014, 19 pgs.
English Abstract and Machine Translation for Japanese Publication No. 2016-048741 A, published Apr. 7, 2016, 11 pgs.
English Abstract and Machine Translation for International Publication No. WO2012157053 A1, published Nov. 22, 2012, 27 pgs.
English Abstract and Machine Translation for Chinese Publication No. 109256266 A, published Jan. 22, 2019, 10 pgs.
English Machine Translation for Japanese Publication No. S48-001343 Y, published Jan. 13, 1973, 5 pgs.
English Machine Translation for Japanese Publication No. S48-092872 A, published Dec. 1, 1973, 5 pgs.
English Abstract and Machine Translation for Chinese Publication No. 105529166 A, published Apr. 27, 2016, 7 pgs.
Untranslated Decision to Grant a Patent mailed by Japan Patent Office (JPO) for Application No. 2017-178296, dated Jul. 23, 2019, 3 pgs.
English Machine Translation of Decision to Grant a Patent mailed by Japan Patent Office (JPO) for Application No. 2017-178296, dated Jul. 23, 2019, 2 pgs.
Untranslated Decision of Refusal mailed by Japan Patent Office (JPO) for Application No. 2017-178296, dated May 14, 2019, 6 pgs.
English Machine Translation of Decision of Refusal mailed by Japan Patent Office (JPO) for Application No. 2017-178296, dated May 14, 2019, 5 pgs.
Untranslated Notice of Reasons for Refusal mailed by Japan Patent Office (JPO) for Application No. 2017-178296, dated Feb. 19, 2019, 13 pgs.
English Machine Translation of Notice of Reasons for Refusal mailed by Japan Patent Office (JPO) for Application No. 2017-178296, dated Feb. 19, 2019, 11 pgs.
English Abstract and Machine Translation for Japanese Publication No. JPH11-008138 A, published Jan. 12, 1999, 91 pgs.
English Abstract and Machine Translation for Japanese Publication No. JPH08-167527 A, published Jun. 25, 1996, 9 pgs.
English Abstract and Machine Translation for Japanese Publication No. JPH09-159614 A, published Jun. 20, 1997, 8 pgs.
English Abstract and Machine Translation for Japanese Publication No. JPH10-223454 A, published Aug. 21, 1998, 12 pgs.
English Abstract and Machine Translation for Japanese Publication No. 2011-250529 A, published Dec. 8, 2011, 17 pgs.
English Abstract and Machine Translation for Japanese Publication No. 2016-058513 A, published Apr. 21, 2016, 17 pgs.
English Abstract and Machine Translation for Japanese Publication No. 2013-115407 A, published Jun. 10, 2013, 20 pgs.
English Machine Translation for Japanese Publication No. JPS60-005105 U, published Jan. 14, 1985, 3 pgs.
English Abstract and Machine Translation for Japanese Publication No. 2003-229315 A, published Aug. 15, 2003, 9 pgs.
English Abstract and Machine Translation for Japanese Publication No. 2012-222083 A, published Nov. 12, 2012, 97 pgs.

* cited by examiner

TRANSFORMATION RATIO $\alpha = V_1/V_2 = N_1/N_2$

TRANSFORMATION RATIO $\beta = V_1/V_3 = N_1/N_3$

THREE-PHASE TRANSFORMER

This application is a new U.S. patent application that claims benefit of JP 2017-178296 filed on Sep. 15, 2017, the content of JP 2017-178296 is incorporated herein by reference.

BACKGROUND OF THE INVENTION

1. Field of the Invention

The present invention relates to a three-phase transformer.

2. Description of Related Art

Stationary induction apparatuses in which a plurality of windings are linearly arranged are reported to date (for example, Japanese Unexamined Patent Publication (Kokai) No. 2016-048741, hereinafter referred to as Patent Document 1). A stationary induction apparatus described in Patent Document 1 has N-phase N-legged main magnetic paths (N is three or more) and main windings each wound on each main leg. The stationary induction apparatus includes a control magnetic flux generation means for generating a control magnetic flux the amount of which is variable in a direction substantially perpendicular to any of N-phase main magnetic fluxes at an intersection point of the N main legs. By the control of the amount of the control magnetic flux using the control magnetic flux generation means, the N-phase reactance is made variable. Although the stationary inductance apparatus according to Patent Document 1 is a stationary inductance apparatus having a variable reactance, the shape of a three-phase iron core is asymmetrical, and the lengths of the three-phase magnetic paths cannot be equalized in structure. Thus, there is a problem that various values including a magnetic flux density, etc., cannot be completely equal. The three-phase asymmetry may cause heat generation, other than normal heat generation, and leakage flux, and a coupling coefficient is conceivable to be of the order of approximately 0.3. General transformers have the same iron core structure, and leakage flux may cause noise. For example, large transformers are not only enclosed with covers but also fenced around in order to basically keep people away. Furthermore, in recent times, transformers are strongly required to have high efficiency for the global environment, and therefore are required to reduce unnecessary leakage flux.

Electric power converters having circumferentially arranged three-phase coils are also reported (for example, International Publication No. 2012/157053, hereinafter referred to as Patent Document 2). An electric power converter according to Patent Document 2 includes two opposite yoke cores, three magnetic iron cores having coils wound thereon and a gap adjustment means, and three zero-phase magnetic iron cores having no coils wound thereon. The two opposite yoke cores are connected to each other by the three magnetic iron cores and the three zero-phase magnetic iron cores. The three magnetic iron cores are arranged in a circumference at predetermined angles with respect to a concentric axis of the yoke cores. The three zero-phase magnetic iron cores are arranged in a circumference between the three magnetic iron cores with respect to the concentric axis of the yoke cores. Owing to the three zero-phase magnetic iron cores, magnetic flux flows through the zero-phase magnetic iron cores. Since less magnetic flux flows through the other phases, a mutual inductance is reduced. Therefore, this structure is not suited for use of the mutual inductance. Since the general converters use magnetic flux of the mutual inductance, this structure is not suited for the general converters.

In the electric power converter according to Patent Document 2, the iron core is made from a thin plate wound into a roll, and magnetic flux tends to flow in a roll. Thus, since the magnetic flux does not flow in a minimum route, mutual inductance and self-inductance tend to be low. There are also a manufacture problem and an assembly problem that this structure is unsuitable for machining of holes, taps, etc. Therefore, for example, there is a problem that an inductance adjustment mechanism (screws, etc.) is hard to use. Furthermore, there is also a problem that it is hard to prevent leakage of magnetic flux generated from the coils. In other words, the converters are strongly required to have low magnetic resistance and reduced leakage flux, and therefore their iron cores are variously devised, such as use of directional magnetic steel sheets and the way to assemble the iron cores.

SUMMARY OF THE INVENTION

The present invention aims at providing a three-phase converter in which three phases are balanced, and that achieves less leakage flux and higher efficiency.

A three-phase transformer according to an embodiment includes a first plate iron core and a second plate iron core disposed opposite each other; a plurality of columnar iron cores disposed between the first plate iron core and the second plate iron core so as to be connected to the first plate iron core or the second plate iron core, the number of the columnar iron cores being an integer multiple of 3, the columnar iron cores being disposed rotation-symmetrically with respect to an axis equidistant from central axes of the columnar iron cores; and coils including a plurality of primary coils and a plurality of secondary coils, the number of the primary coils being an integer multiple of 3, the number of the secondary coils being an integer multiple of 3, the primary coils and the secondary coils being wound on the individual columnar iron cores.

BRIEF DESCRIPTION OF THE DRAWINGS

The objects, features, and advantages of the present invention will be more apparent from the following description of embodiments accompanying with the drawings. In the drawings.

DETAILED DESCRIPTION OF THE INVENTION

A three-phase transformer according to the present invention will be described below with reference to the drawings. However, the technical scope of the present invention is not limited to its embodiments, but includes the invention described in claims and equivalents thereof.

Figure 1:
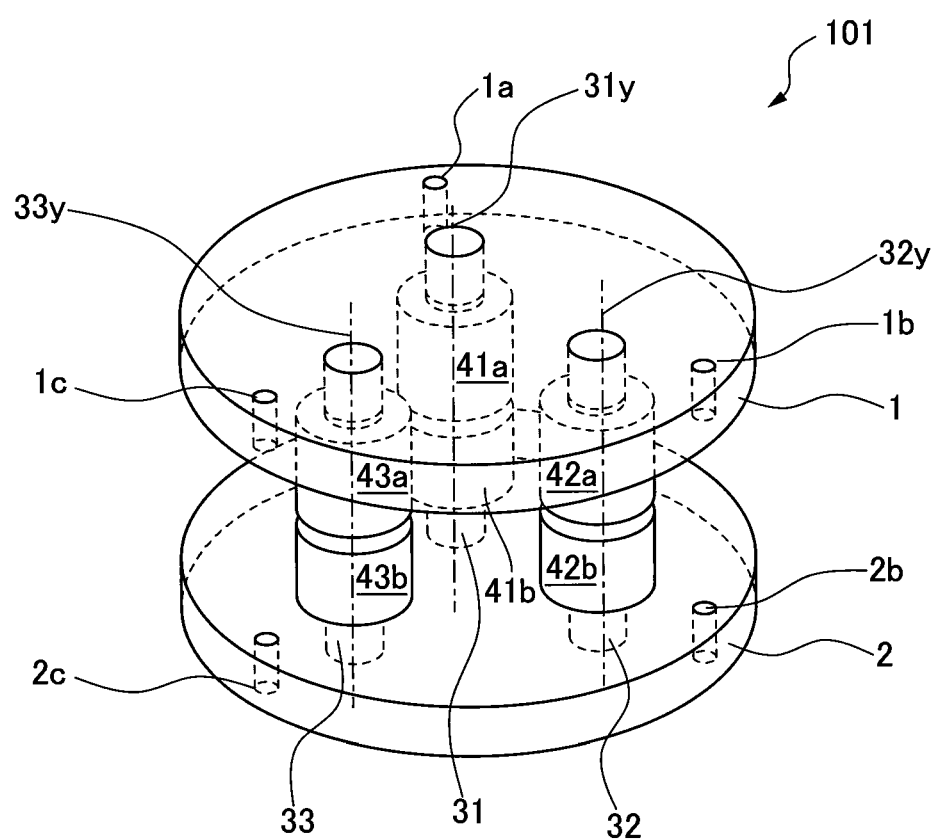
FIG. 1 is a perspective view of a three-phase transformer according to a first embodiment.

A three-phase transformer according to a first embodiment will be first described. FIG. 1 is a perspective view of the three-phase transformer according to the first embodiment. A three-phase transformer 101 according to the first embodiment includes a first plate iron core 1, a second plate iron core 2, a plurality of columnar iron cores (31, 32, and 33), and coils including a plurality of primary coils (41a, 42a, and 43a) and a plurality of secondary coils (41b, 42b, and 43b). The three-phase transformer is composed using the primary coil 41a and the secondary coil 41b as U-phase coils, the primary coil 42a and the secondary coil 42b as V-phase coils, the primary coil 43a and the secondary coil 43b as W-phase coils.

The first plate iron core 1 and the second plate iron core 2 are iron cores disposed opposite each other. In the example of FIG. 1, each of the first plate iron core 1 and the second plate iron core 2 has a disk shape, but not limited to this example, may have an elliptical shape or a polygonal shape. The first plate iron core 1 and the second plate iron core 2 are preferably made of a magnetic material. In the first plate iron core 1 and the second plate iron core 2, screw holes (1a, 1b, 1c, 2a (not shown), 2b, and 2c), which are used as a gap adjustment mechanism described later, are formed.

The columnar iron cores (31, 32, and 33) are a plurality of columnar iron cores, the number of which is an integer multiple of 3, that are disposed between the first plate iron core 1 and the second plate iron core 2 so as to be connected to at least one of the first plate iron core 1 and the second plate iron core 2. The columnar iron cores (31, 32, and 33) are arranged rotation-symmetrically with respect to an axis equidistant from central axes (31y, 32y, and 33y) of the columnar iron cores.

The primary coils (41a, 42a, and 43a) are coils the number of which is an integer multiple of 3. The secondary coils (41b, 42b, and 43b) are coils the number of which is an integer multiple of 3. The primary coils (41a, 42a, and 43a) and the secondary coils (41b, 42b, and 43c) are wound on the individual columnar iron cores (31, 32, and 33), respectively. When the primary coil has a voltage of $V_1$ and a winding number of $N_1$, and the secondary coil has a voltage of $V_2$ and a winding number of $N_2$, a transformation ratio $\alpha$ is represented by the following equation:

$$\alpha = V_1/V_2 = k \times N_1/N_2$$

However, k is a coupling coefficient of the primary coil and the secondary coil, and ideally 1.

In the example of FIG. 1, the number of the columnar iron cores is three, but the present invention is not limited to the example. For example, axisymmetrically arranged six columnar iron cores may be connected in series or in parallel so as to compose one transformer, or may be provided with six wires as is so as to compose two transformers. In the case of a single-phase transformer, the number of the columnar iron cores may be two. The primary coils (41a, 42a, and 43a) and the secondary coils (41b, 42b, and 43b) are preferably disposed inside end portions of the first plate iron core 1 and the second plate iron core 2 disposed opposite.

In the example of FIG. 1, each of the columnar iron cores (31, 32, and 33) is in the shape of a circular cylinder. However, each of the columnar iron cores (31, 32, and 33) may be in the shape of an elliptical cylinder or a polygonal cylinder.

Figure 2:
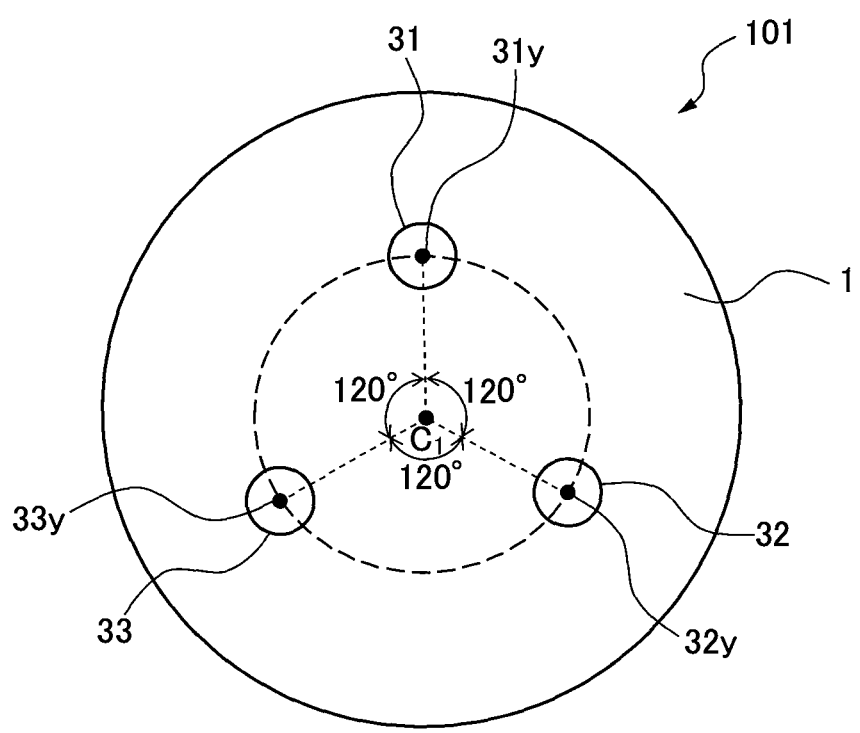
FIG. 2 is a plan view of the three-phase transformer according to the first embodiment.

FIG. 2 is a plan view of the three-phase transformer according to the first embodiment. FIG. 2 is a plan view of the three-phase transformer shown in FIG. 1 viewed from the side of the first plate iron core 1. The columnar iron cores (31, 32, and 33) are arranged rotation-symmetrically with respect to a rotation axis $C_1$ that is an axis equidistant from central axes (31y, 32y, and 33y) of the columnar iron cores (31, 32, and 33). As shown in FIG. 2, when there are three columnar iron cores, the columnar iron cores (31, 32, and 33) are arranged such that their central axes (31y, 32y, and 33y) are arranged at intervals of 120 degrees rotation-symmetrically with respect to the rotation axis $C_1$. This structure avoids an unbalanced state of the three phases. In other words, when load current flows through the three-phase transformer, magnetic flux of the primary coil and magnetic flux of the secondary coil are ideally cancelled to each other. If the three-phase transformer is not symmetrical, unbalance and leakage flux occur. As described in this embodiment, the symmetrical three-phase transformer avoids the occurrences of unbalance and leakage flux, thus allowing an increase in efficiency.

The rotation axis $C_1$ may coincide with the central axis of the first plate iron core 1 or the second plate iron core 2.

Figure 3:
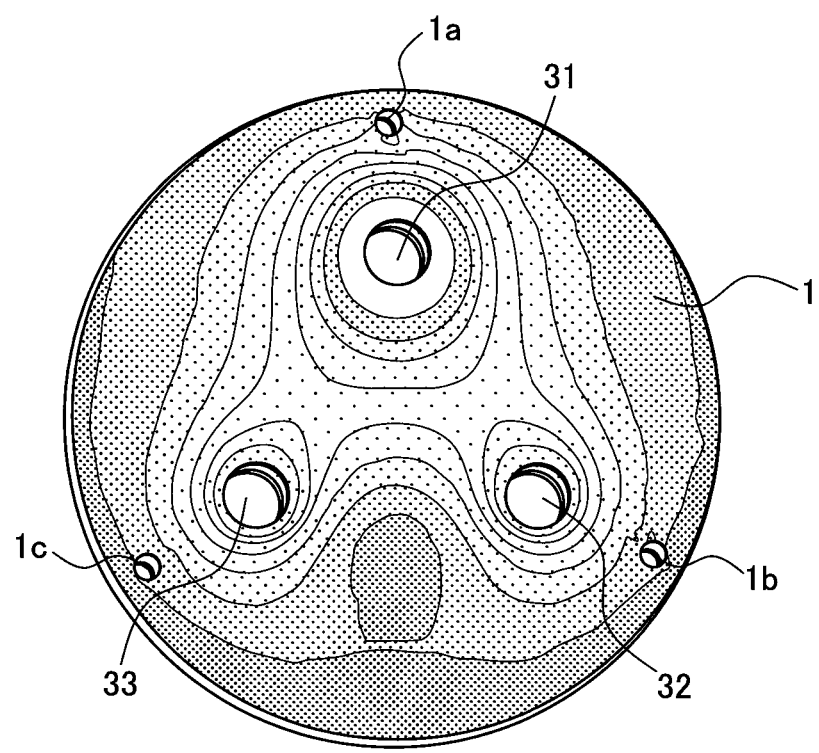
FIG. 3 is a drawing showing a magnetic analysis result in a first plate iron core of the three-phase transformer according to the first embodiment.

FIG. 3 shows a magnetic analysis result in a certain phase of three-phase alternating current in the first plate iron core of the three-phase transformer according to the first embodiment. In the phase, a maximum current flows through the primary coil 41a wound on the columnar iron core 31, and a current half the maximum current flows in the opposite direction through each of the columnar iron cores 32 and 33.

Thus, magnetic flux extends from the columnar iron core 31 to each of the columnar iron cores 32 and 33. Magnetic flux density is high in the vicinity of the columnar iron core 31, and is reduced with an increase in distance from the columnar iron core 31. Since the entire first plate iron core is widely used without waste, magnetic saturation is relieved, and inductance is hard to reduce. Since normal three-phase magnetic flux is generated in the columnar iron cores (31, 32, and 33), magnetic flux of one of the columnar iron cores passes through the other columnar iron cores, and therefore not only self-inductance but also mutual inductance is actively used. Accordingly, inductance is calculated by the following equation:

Inductance=Self-inductance+Mutual Inductance

As a result, magnetic flux generated by the mutual inductance can be effectively used.

As shown in FIG. 3, due to the structure in which magnetic flux passes through the center of the first plate iron core 1, the magnetic flux extending from the columnar iron core 31 to the first plate iron core 1 flows linearly into the other columnar iron cores (32 and 33). The magnetic flux flows with high efficiency, thus resulting in an increase in the mutual inductance.

Figure 4:
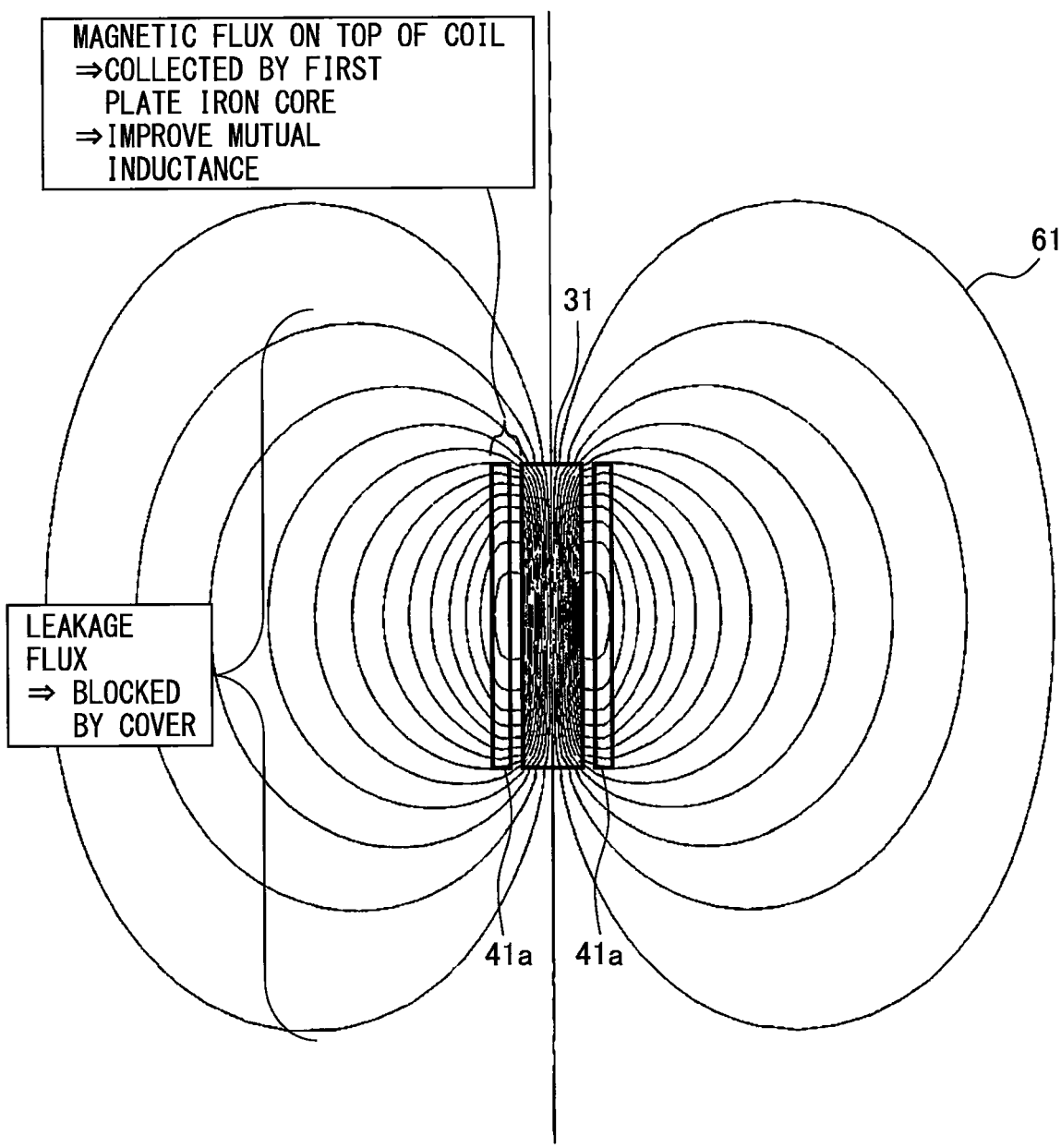
FIG. 4 is a drawing of magnetic flux lines of the three-phase transformer according to the first embodiment.

FIG. 4 is a drawing of magnetic flux lines of a columnar iron core coil. FIG. 4 shows magnetic flux lines 61 generated by the columnar iron core 31 on which the primary coil 41*a* is wound. According to FIG. 4, disposing the first plate iron core 1 over the primary coils (41*a*, 42*a*, and 43*a*) to recover magnetic flux of every coil, which generally leaks from the top of every coil, results in an increase in mutual inductance, as well as an increase in self-inductance. The same is true for the second plate iron core 2 having the secondary coils (41*b*, 42*b*, and 43*b*). Furthermore, a later-described cover can block leakage flux.

According to the magnetic analysis result of FIG. 3, it is apparent from magnetic flux in the vicinities of the columnar iron cores (31, 32, and 33) and a bulging flow of magnetic flux between the columnar iron cores that, even in a single-phase transformer having two columnar iron cores, mutual inductance can be increased through the first plate iron core 1.

Furthermore, as is apparent from FIG. 3, screw holes (1*a*, 1*b*, and 1*c*), tap holes, etc., used in a later-described gap adjustment mechanism do not cause a reduction in inductance, as long as the screw holes (1*a*, 1*b*, and 1*c*), the tap holes, etc., are provided in positions having no effect on the magnetic flux.

As is apparent from FIG. 3, since electromagnetic steel sheets are laminated in axial directions of the columnar iron cores (31, 32, and 33), as the first plate iron core 1 and the second plate iron core 2, this structure facilitates a flow of magnetic flux, as compared with the case of using winding cores.

According to the structure of the present invention, as a coupling method between the first plate iron core 1, the second plate iron core 2, and the columnar iron cores (31, 32, and 33), the following methods are conceivable.

(1) fitting: recesses are formed in the first plate iron core 1 or the second plate iron core 2, and the columnar iron cores are inserted into the recesses.

(2) screwing: screw holes are formed in the columnar iron cores, and through holes are formed in the first plate iron core 1 or the second plate iron core 2.

(3) press-fitting and others: holes are formed in the first plate iron core 1 or the second plate iron core 2 to press-fit pins therein.

For example, holes may be formed in the first plate iron core 1 and the second plate iron core 2 to fit the columnar iron cores (31, 32, and 33) therein, and the columnar iron cores (31, 32, and 33) may be fitted into the holes. However, considering the size of the transformer depending on its application, the coupling may be performed by another method. For example, the first plate iron core 1 and the second plate iron core 2 may be secured with screws.

In the above description, neither of the first plate iron core 1 and the second plate iron core 2 has a hole at its center, but a hole may be formed at the center of at least one of the first plate iron core 1 and the second plate iron core 2.

In the above description, no gap is formed in the columnar iron cores (31, 32, and 33), but a first gap may be formed in at least one of the columnar iron cores (31, 32, and 33) so that the air gap produces inductance. Air has a relative magnetic permeability of 1, which is largely different from the relative magnetic permeability of the iron core, and therefore may be actively used for obtaining a constant inductance. The "first gap" refers to a gap that, when the columnar iron core is divided into a plurality of columnar iron core portions, formed between the opposite columnar iron core portions. The first gap may be formed such that the columnar iron core portions are opposed across a plane orthogonal to a longitudinal direction of the columnar iron cores (31, 32, and 33). The first gap is preferably provided between a region of each of the columnar iron cores (31, 32, and 33) on which the primary coils (41*a*, 42*a*, and 43*a*) are wound and a region of each of the columnar iron cores (31, 32, and 33) on which the secondary coils (41*b*, 42*b*, and 43*b*) are wound. Magnetic resistance is calculated from the length, magnetic permeability, and cross-sectional area of a magnetic path, and the magnetic permeability of the columnar iron core is of the order of 1000 times that of air. Therefore, when comparing between an iron core type transformer having gaps and an iron core type transformer having no gap, in the former transformer, air layers forming the gaps mainly constitute magnetic resistance, and the magnetic resistance of the iron cores is negligible. On the contrary, in the latter transformer, the magnetic resistance of the iron cores is predominant. Since only by providing the air layers in the gaps, physical properties, i.e., a flow of magnetic flux, largely varies owing to a difference in magnetic permeability, the transformers have a variety of applications. Current to saturate the iron cores is largely different too, and therefore the applications of the transformers differ depending on the presence or absence of the gaps.

In the transformers, if there is a situation in which magnetic flux is not completely cancelled, various effects are produced in a transformer ratio, electromagnetic waves, efficiency, etc. Thus, just as with three-phase alternating current, the sum of three magnetic fluxes is required to be always 0. According to the three-phase transformer of the first embodiment, three-phase magnetic resistances become equal and small, owing to the arrangement of the columnar iron cores and the shape of the first plate iron core 1 and the second plate iron core 2, and the sum of magnetic fluxes is 0 in the first plate iron core 1 and the second plate iron core 2 through which the magnetic fluxes of three phases pass concurrently and mutually. When magnetizing current flows through the primary coil, magnetic flux passes through the columnar iron core, and hence leakage flux can be reduced. In the first plate iron core 1 and the second plate iron core 2 through which magnetic fluxes of three phases pass concurrently and mutually, the sum of the magnetic fluxes becomes 0.

Figure 5:
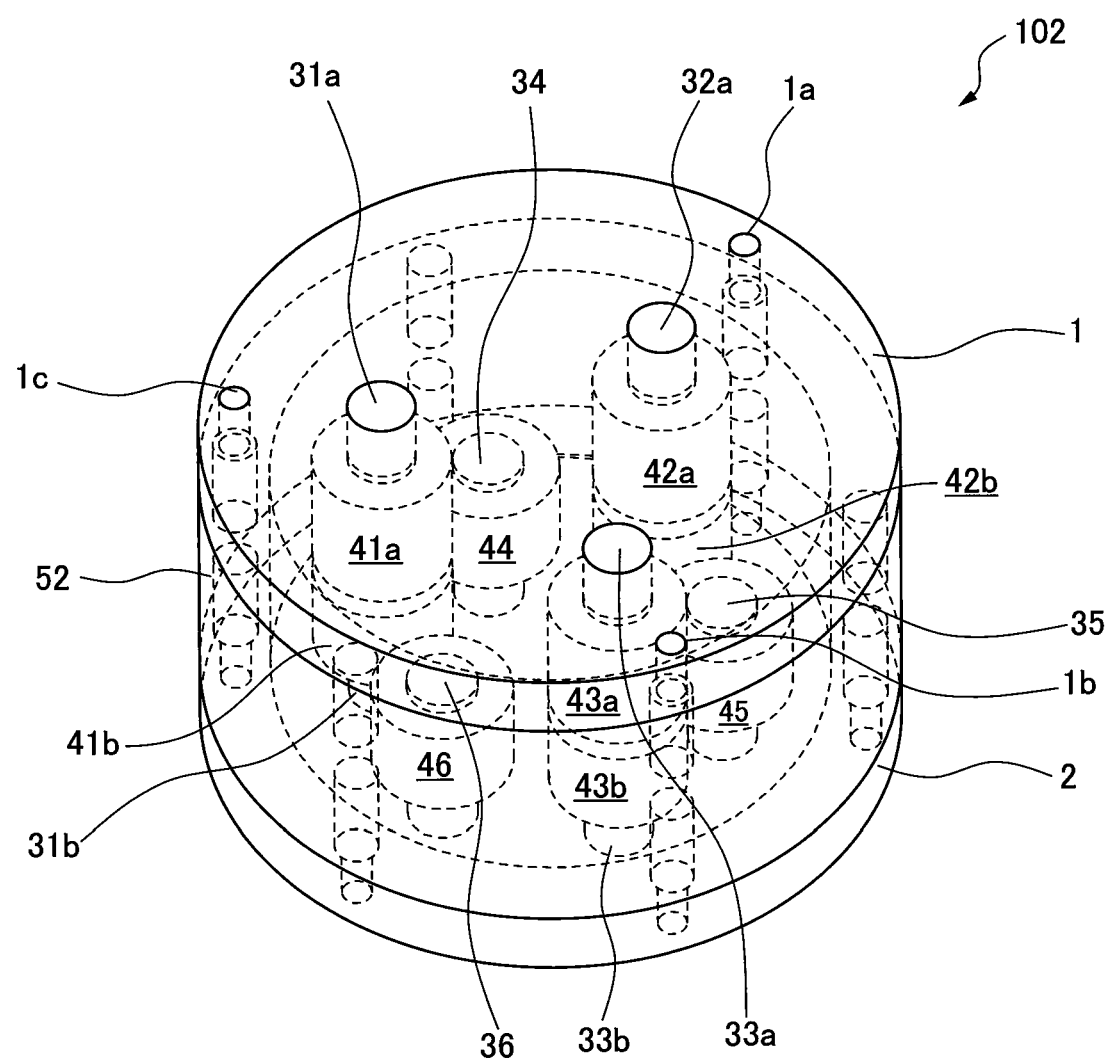
FIG. 5 is a perspective view of a three-phase transformer according to a second embodiment.
Figure 6:
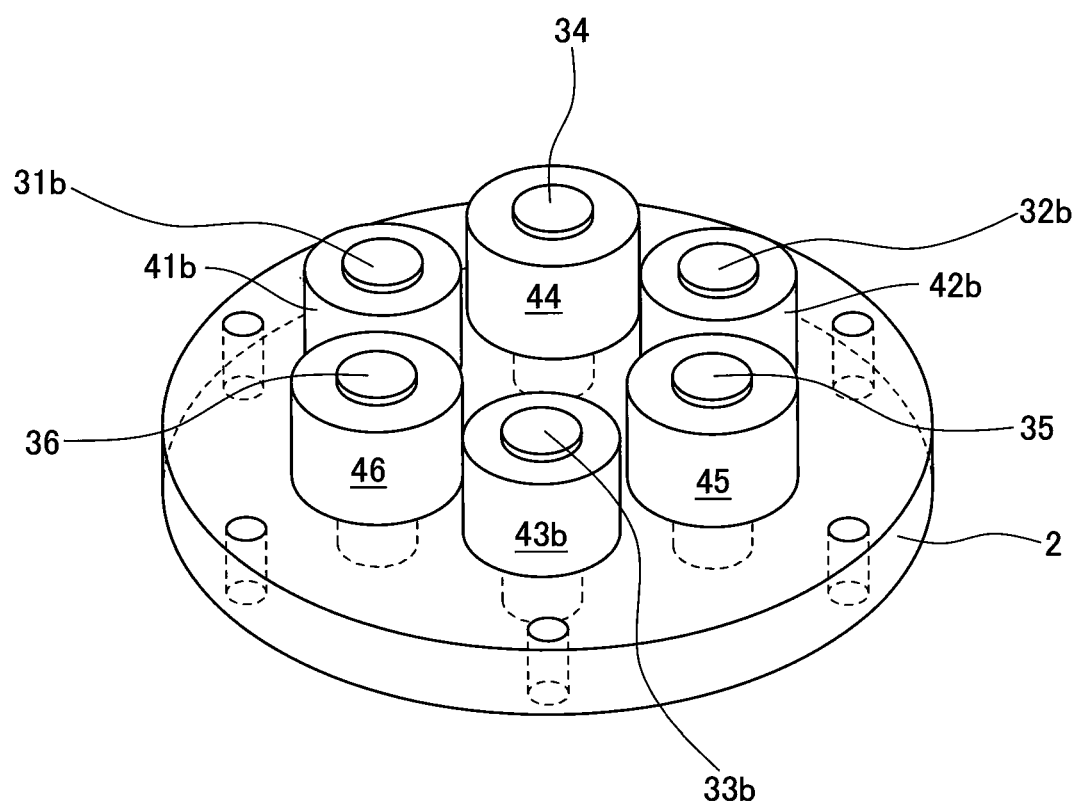
FIG. 6 is a perspective view of a second plate iron core, columnar iron cores provided on the second plate iron core, and coils of the three-phase transformer according to the second embodiment.

Next, a three-phase transformer according to a second embodiment will be described. FIG. 5 is a perspective view of the three-phase transformer according to the second embodiment. FIG. 6 is a perspective view of a second plate iron core of the three-phase transformer according to the second embodiment, and columnar iron cores and coils provided on the second plate iron core. The difference between a three-phase transformer 102 according to the second embodiment and the three-phase transformer 101 according to the first embodiment is that each of the columnar iron cores can be divided into a first columnar iron core portion (31a, 32a, or 33a) on which a primary coil (41a, 42a, or 43a) is wound, and a second columnar iron core portion (31b, 32b, or 33b) on which a secondary coil A (41c, 42c, or 43c) is wound. The second plate iron core 2 includes a plurality of third columnar iron core portions (34, 35, and 36), and a plurality of secondary coils B (44, 45, and 46) that are wound on the third columnar iron core portions, respectively, and have a different winding number from the secondary coils A. The first plate iron core 1 or the second plate iron core 2 is rotatable with respect to a rotation axis, so as to selectively switch between a combination of the primary coils (41a, 42a, and 43a) and the secondary coils A (41c, 42c, and 43c) and a combination of the primary coils (41a, 42a, and 43a) and the secondary coils B (44, 45, and 46). The other structure of the three-phase transformer 102 according to the second embodiment is the same as that of the three-phase transformer 101 according to the first embodiment, so a detailed description thereof is omitted.

As shown in FIG. 5, the first columnar iron core portions (31a, 32a, and 33a) on which the primary coils (41a, 42a, and 43a) are wound can be separated from the second columnar iron core portions (31b, 32b, and 33b) on which the secondary coils A (41c, 42c, and 43c) are wound. The first columnar iron core portions (31a, 32a, and 33a) are secured on the first plate iron core 1. On the other hand, as shown in FIG. 6, the second columnar iron core portions (31b, 32b, and 33b) and the third columnar iron core portions (34, 35, and 36) on which the secondary coils B (44, 45, and 46) are wound are secured on the second plate iron core 2.

The first columnar iron core portions (31a, 32a, and 33a) are arranged rotation-symmetrically with respect to an axis equidistant from central axes of the first columnar iron core portions. In examples shown in FIGS. 5 and 7, the first columnar iron core portions (31a, 32a, and 33a) are arranged such that their central axes are arranged at intervals of 120 degrees rotation-symmetrically with respect to the rotation axis.

In the same manner, the second columnar iron core portions (31b, 32b, and 33b) are arranged rotation-symmetrically with respect to an axis equidistant from central axes of the second columnar iron core portions. In the example shown in FIGS. 5 to 7, the second columnar iron core portions (31b, 32b, and 33b) are arranged such that their central axes are arranged at intervals of 120 degrees rotation-symmetrically with respect to the rotation axis. As shown in FIG. 5, when the first plate iron core 1 is disposed in a predetermined position, the first columnar iron core portions (31a, 32a, and 33a) are arranged so as to overlap the second columnar iron core portions (31b, 32b, and 33b), respectively.

Figure 7:
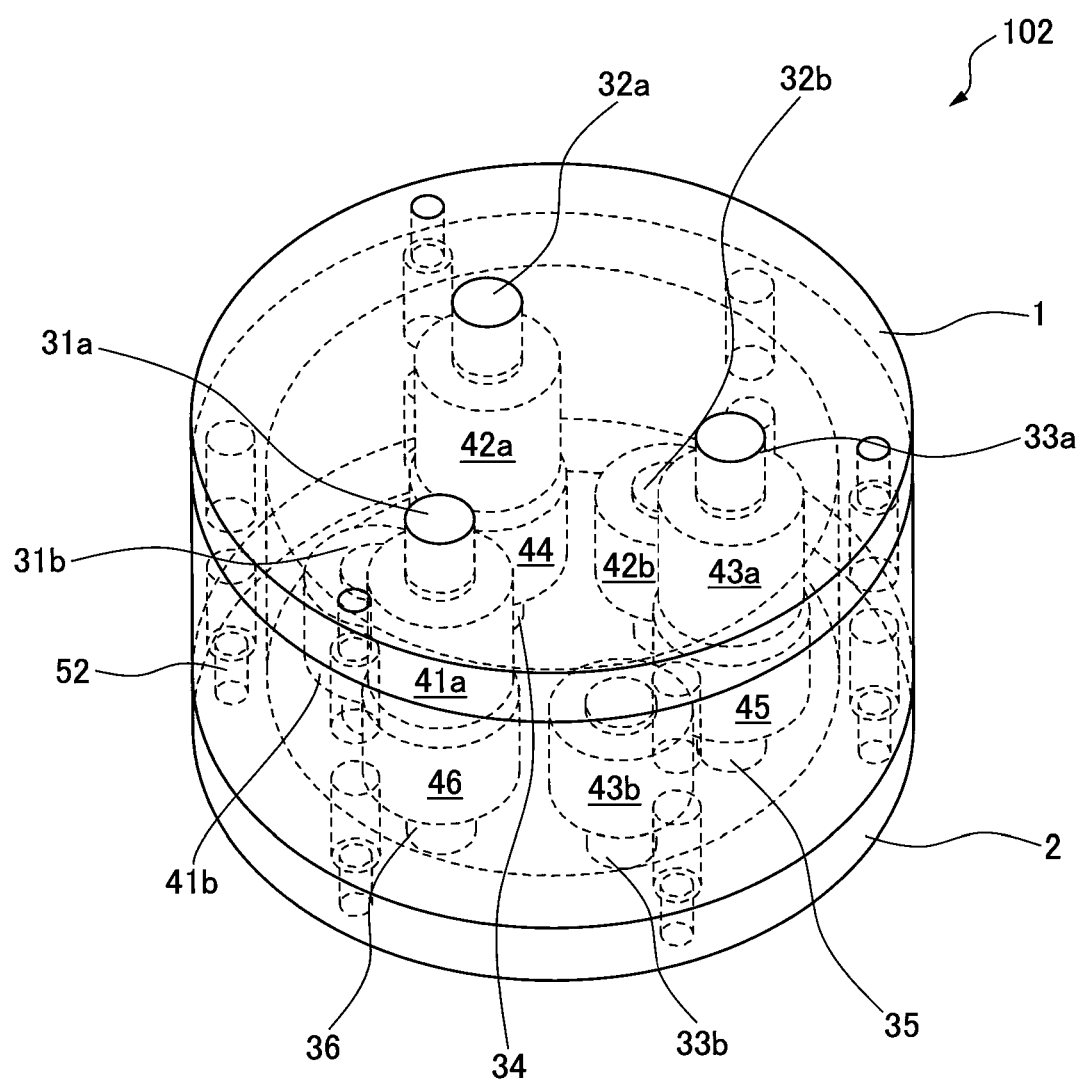
FIG. 7 is a perspective view of the three-phase transformer according to the second embodiment, after the first plate iron core is rotated.

Furthermore, the third columnar iron core portions (34, 35, and 36) are arranged rotation-symmetrically with respect to an axis equidistant from central axes of the third columnar iron core portions. In the examples shown in FIGS. 5 to 7, the third columnar iron core portions (34, 35, and 36) are arranged such that their central axes are arranged at intervals of 120 degrees rotation-symmetrically with respect to the rotation axis. As shown in FIG. 7, when the first plate iron core 1 is rotated and disposed in another predetermined position, the first columnar iron core portions (31a, 32a, and 33a) are preferably arranged so as to overlap the third columnar iron core portions (34, 35, and 36). For example, the third columnar iron core portions (34, 35, and 36) are arranged in such positions that the second columnar iron core portions (31b, 32b, and 33b) are rotated by 60 degrees.

Since the second columnar iron core portions (31a, 32a, and 33a) can be separated from the second columnar iron core portions (31b, 32b, and 33b), the first plate iron core 1 can be rotated relative to the second plate iron core 2. The first plate iron core 1 can be secured on a cover 52 by screwing, etc., through screw holes (1a, 1b, and 1c). After a rotation, the first plate iron core 1 can be resecured on the cover 52 by screwing, etc., in a new position.

A rotation of the first plate iron core 1 with respect to the rotation axis selectively switches between a combination of the primary coils (41a, 42a, and 43a) and the secondary coils A (41c, 42c, and 43c) and a combination of the primary coils (41a, 42a, and 43a) and the secondary coils B (44, 45, and 46), thus allowing changing a transformation ratio. In the example of FIG. 5, the primary coils (41a, 42a, and 43a) are combined with the secondary coils A (41c, 42c, and 43c), respectively. At this time, the iron cores of the primary coils contact the iron cores of the secondary coils A. When the primary coil has a voltage of $V_1$ and a winding number of $N_1$, and the secondary coil has a voltage of $V_2$ and a winding number of $N_2$, a transformation ratio $\alpha$ is represented by the following equation:

$$\alpha = V_1/V_2 = k \times N_1/N_2$$

wherein, k is a coupling coefficient of the primary coil and the secondary coil A, and ideally 1.

FIG. 7 is a perspective view of the three-phase transformer according to the second embodiment, after the first plate iron core 1 is rotated counterclockwise by 60 degrees. In the example of FIG. 7, the primary coils (41a, 42a, and 43a) are combined with the secondary coils B (44, 45, and 46). When the primary coil has a voltage of $V_1$ and a winding number of $N_1$, and the secondary coil B has a voltage of $V_3$ and a winding number of $N_3$ ($\neq N_2$), a transformation ratio $\beta$ is represented by the following equation:

$$\beta = V_1/V_3 = k' \times N_1/N_3$$

wherein, k' is a coupling coefficient of the primary coil and the secondary coil B, and ideally 1.

When the coupling coefficients k and k' are almost equal, the transformation ratios $\alpha$ and $\beta$ take different values, because the winding number $N_2$ of the secondary coil A is different from the winding number $N_3$ of the secondary coil B. Accordingly, the transformation ratio can be switched between $\alpha$ and $\beta$ by switching which of the secondary coils A and the secondary coils B to combine with the primary coils.

Figure 8A:
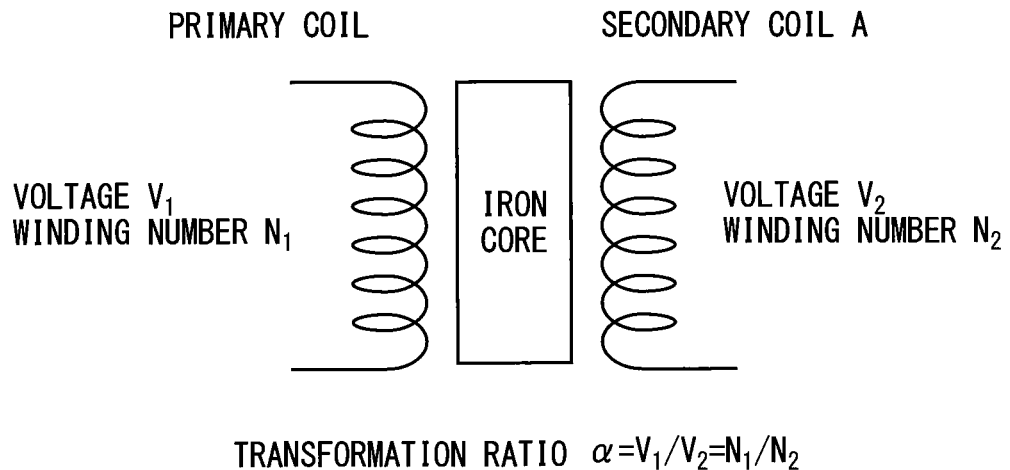
FIG. 8A is an equivalent circuit of the three-phase transformer according to the second embodiment, when a primary coil is combined with a secondary coil A.
Figure 8B:
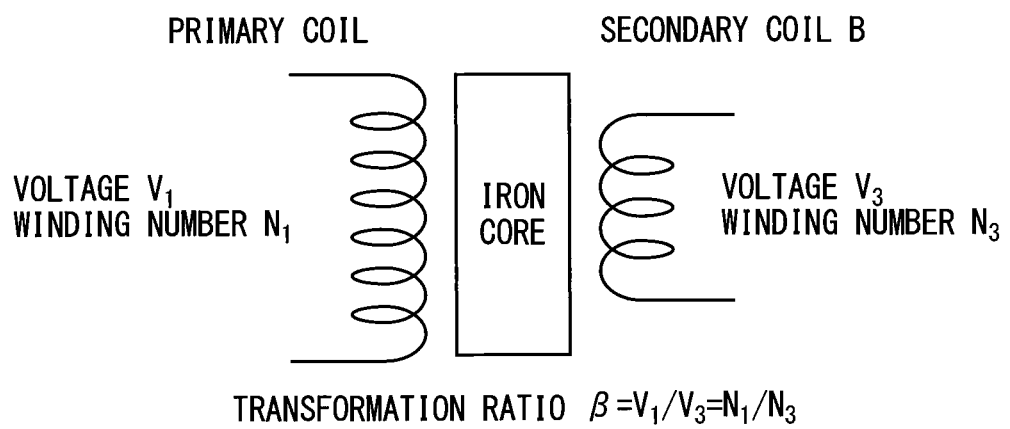
FIG. 8B is an equivalent circuit of the three-phase transformer according to the second embodiment, when the primary coil is combined with a secondary coil B.

In a state that the primary coils are combined with the secondary coils A and the iron cores contact, two terminals of each of the secondary coils B are open. The iron cores of the secondary coils B do not contact any of the iron cores. FIGS. 8A and 8B are equivalent circuits of the three-phase transformer according to the second embodiment. FIG. 8A is an equivalent circuit of the three-phase transformer, when the primary coil is combined with the secondary coil A. FIG. 8B is an equivalent circuit of the three-phase transformer, when the primary coil is combined with the secondary coil B. In FIGS. 8A and 8B, k=k'=1 holds true. Depending on contact or noncontact of the iron cores, some of the iron cores are functioning as a magnetic circuit, while the other iron cores are not functioning, thus allowing mechanically switching the transformer.

In the examples of FIGS. 5 and 7, the cover 52 is provided on the outer peripheries of the first plate iron core 1 and the second plate iron core 2, but the transformation ratio can be changed without the cover. When the cover 52 is not provided, the first plate iron core 1 and the second plate iron core 2 may be directly secured by screwing, etc.

In the present embodiment, the transformation ratio is changed by rotating the first plate iron core 1 having the three columnar iron cores, but the first plate iron core 1 may be provided with six or more columnar iron cores. For example, the first plate iron core 1 may be provided with a plurality of first columnar iron core portions B (not shown) having a plurality of primary coils B wound thereon, and the primary coils B may be combined with the secondary coils A or the secondary coils B. The transformation ratio can be thereby changed to further two values (γ and δ), and therefore can be switched between four values in total. Furthermore, depending on a way to connect wires of the coils between in series and in parallel, the number of transformers may be changed between one and two or more. For example, since a power supply voltage is different from country to country, a transformation ratio is required to be changed according to where electrical equipment or an electrical machine to which the transformer is connected is moved. By making the transformation ratio changeable, it is possible to eliminate the need for newly providing another transformer having a different transformation ratio, and to eliminate a situation in which the transformer becomes unnecessary.

Figure 9:
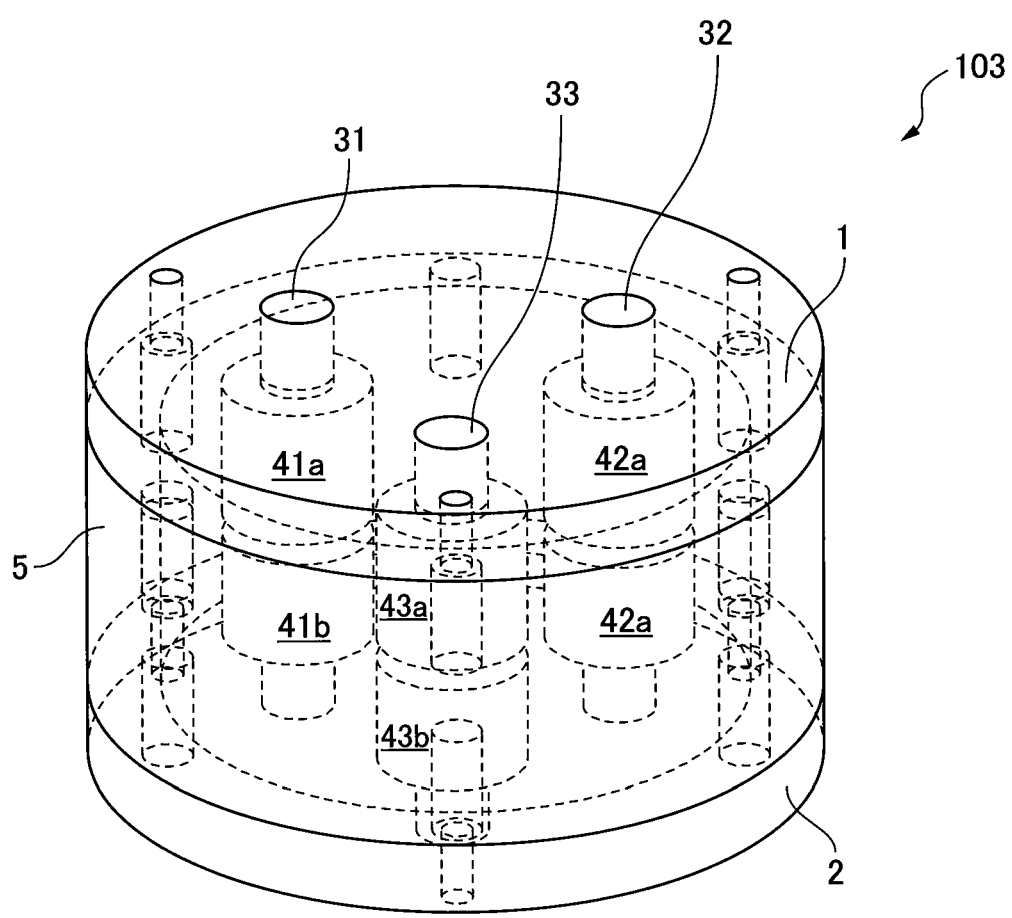
FIG. 9 is a perspective view of a three-phase transformer according to a third embodiment.

Next, a three-phase transformer according to a third embodiment will be described. FIG. 9 is a perspective view of the three-phase transformer according to the third embodiment. The difference between a three-phase transformer 103 according to the third embodiment and the three-phase transformer 101 according to the first embodiment is that a cover 5 is further provided on outer peripheries of a first plate iron core 1 and a second plate iron core 2, so as to enclose a plurality of columnar iron cores (31, 32, and 33), a plurality of primary coils (41a, 42a, and 43a), and a plurality of secondary coils (41b, 42b, and 43b). The other structure of the three-phase transformer 103 according to the third embodiment is the same as that of the three-phase transformer 101 according to the first embodiment, so a detailed description thereof is omitted.

In transformers, when a gap is formed in a columnar iron core, a large suction force is produced in the gap portion in an axial direction of the columnar iron core. Even in transformers without a gap, sound leads to noise, owing to magnetostriction of an iron core. As to the magnetostriction, variations in magnetic flux through the iron core causes stress and deformation of the iron core, and results in noise. Therefore, a cover 5 is preferably provided to support the structure against the suction force. The cover 5 may be made of any material of iron, aluminum, and resin. Alternatively, the cover may be made of a magnetic material or a conductive material.

Figure 10A:
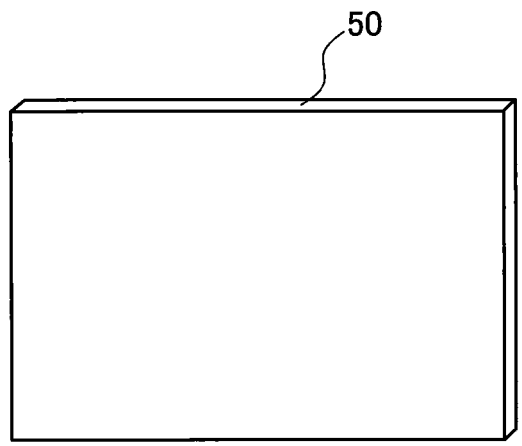
FIG. 10A is a perspective view of a base material to form a cover of the three-phase transformer according to the third embodiment.

FIG. 10A is a perspective view of a base material to form a cover of the three-phase transformer according to the third embodiment. As a base material 50, a ferromagnetic material sheet is preferably used. As the ferromagnetic material sheet, for example, an electromagnetic steel sheet can be used. An insulation processing is preferably applied to a surface of the base material 50. At least one of the first plate iron core 1, the second plate iron core 2, the columnar iron cores (31, 32, and 33), and the cover 5 may be made from a winding core.

Figure 10B:
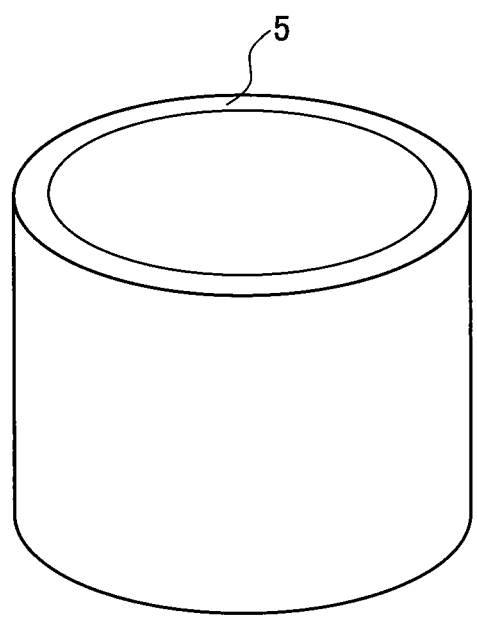
FIG. 10B is a perspective view of the cover of the three-phase transformer according to the third embodiment.

FIG. 10B is a perspective view of a cover of the three-phase transformer according to the third embodiment. By winding the rectangular base material 50, as shown in FIG. 10A, along outer peripheries of the first plate iron core 1 and the second plate iron core 2, a cylindrical cover 5, as shown in FIG. 10B, can be formed. In the cases of transformers having small diameters, the cylindrical cover 5 may be formed by winding the base material 50 on a cylindrical member. The cover may be made of carbon steel, etc., instead of the electromagnetic steel sheet. When the cover is in the shape of a cylinder, the cover is easily machined using a lathe, and therefore can be machined and manufactured inexpensively and accurately. Since the cylindrical cover has a maximum volume inside its cylinder, as compared with covers having the same circumferential length, the maximum possible columnar iron cores, coils, etc., can be disposed therein, and the amount of a used material can be reduced. Therefore, the cover is preferably cylindrical in shape, due to rationality in terms of a life cycle of products.

The outer peripheries of the first plate iron core 1 and the second plate iron core 2 are also preferably round or oval in shape. Just as with the cover 5, the first plate iron core 1 and the second plate iron core 2 of a simple shape, such as a round or an oval, can be machined and manufactured with high accuracy. Thus, assembling the columnar iron cores (31, 32, and 33), the first plate iron core 1, the second plate iron core 2, and the cover 5 that are machined with high accuracy facilitates managing gaps formed in the columnar iron cores and keeping the gaps at constant dimensions, thus allowing a reduction in variations in gap length owing to the suction force exerted on the gaps. Even in the transformer having no gap, there are small gaps and air layers formed by laminating and assembling multilayer steel sheets. The accurately machinable structure allows a reduction in magnetic resistance caused by the small gaps and the air layers. However, the cover 5 is not limited to being cylindrical in shape. Even if the first plate iron core 1 and the second plate iron core 2 have a shape other than the round or oval, the present function is fulfilled.

The cover 5 made of iron, aluminum, etc., prevents magnetic flux and electromagnetic waves from leaking to the outside. The cover 5 made of a magnetic material, such as iron, passes magnetic flux therethrough, and prevents leakage flux from getting outside. In other words, the cover 5 made of a high magnetic permeability, such as iron, forms a path of magnetic flux flowing from the columnar iron cores through the first plate iron core 1, the cover 5, and the second plate iron core 2. Furthermore, the cover 5 made of iron, aluminum, etc., can reduce eddy current, and facilitate passage of magnetic flux.

The cover 5 made of a material having a low magnetic permeability and a low resistivity, such as aluminum, can block electromagnetic waves. In general, three-phase alternating current is generated by switching elements, such as IGBT elements, and square electromagnetic waves sometimes present a problem in EMC tests etc. The cover 5 made of resin, etc., can prevent entry of liquid, foreign matter, etc.

A case in which direct current magnetic flux is superimposed on three-phase alternating current, due to some reason, is conceivable. The conventional art proposes providing a zero-phase magnetic iron core as measures against direct current magnetic flux, instead of against zero-phase, i.e., three-phase alternating current. On the other hand, in this embodiment, as shown in the magnetic analysis result of FIG. 3, magnetic flux does not reach the cover 5 provided on the outer periphery. However, it is conceivable that the cover 5 is made of a magnetic material, and, when direct current magnetic flux flows, the unbalanced magnetic flux may flow into the cover, just as with leakage flux. In such an instance, the cover made of the magnetic material may absorb the unbalanced magnetic flux, to eliminate adverse effects thereof.

As shown in FIGS. 5 and 7, a cover 52 may be provided in the three-phase transformer according to the second embodiment. In other words, the cover 52 may be further provided on the outer peripheries of the first plate iron core 1 and the second plate iron core 2, so as to enclose the first columnar iron core portions (31a, 32a, and 33a), the second columnar iron core portions (31b, 32b, and 33b), the third columnar iron core portions (34, 35, and 36), the primary coils (41a, 42a, and 43a), the secondary coils A (41c, 42c, and 43c), and the secondary coils B (44, 45, and 46). At least one of the first plate iron core 1, the second plate iron core 2, the first columnar iron core portions (31a, 32a, and 33a), the second columnar iron core portions (31b, 32b, and 33b), the third columnar iron core portions (34, 35, and 36), and the cover 52 may be made from a winding core. The cover 52 is preferably made of a magnetic material or a conductive material. The provision of the cover 52 can prevent leakage of electromagnetic waves from the primary coils, the secondary coils A, and the secondary coils B.

Figure 11:
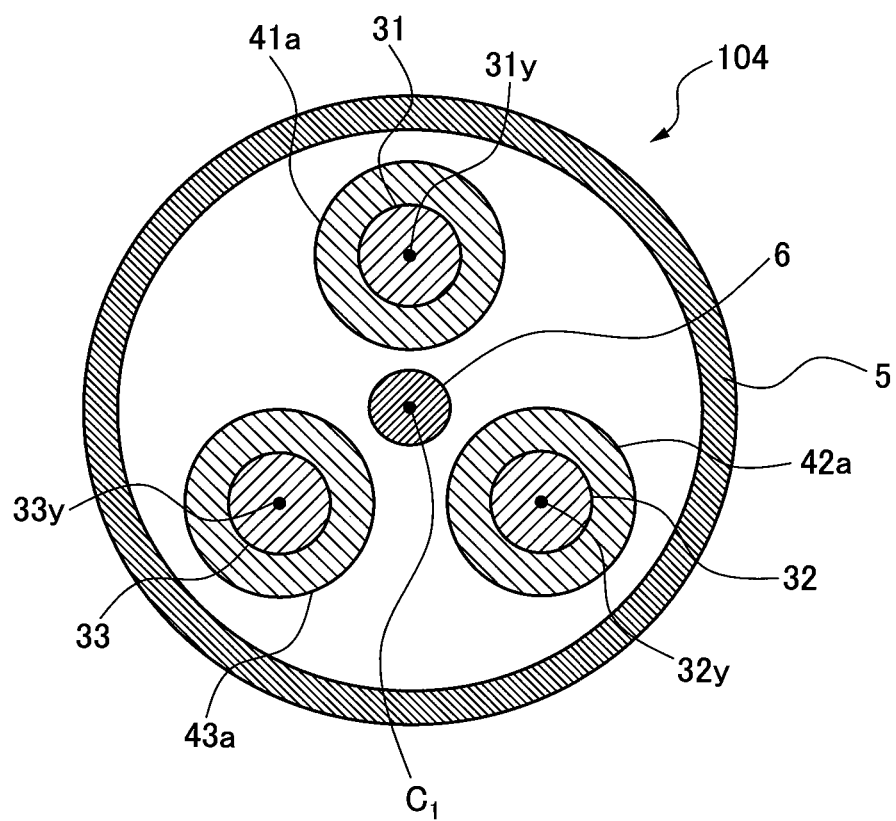
FIG. 11 is a cross-sectional view of a three-phase transformer according to a fourth embodiment.

Next, a three-phase transformer according to a fourth embodiment will be described. FIG. 11 is a cross-sectional view of the three-phase transformer according to the fourth embodiment. In the cross-sectional view of FIG. 11, a plurality of columnar iron cores (31, 32, and 33) having a plurality of primary coils (41a, 42a, and 43a) wound thereon, as shown in FIG. 9, are sectioned at an arbitrary position by a horizontal plane to the first plate iron core 1. The difference between a three-phase transformer 104 according to the fourth embodiment and the three-phase transformer 101 according to the first embodiment is that the three-phase transformer 104 further has a rod member 6 disposed such that its central axis coincides with an axis (rotation axis $C_1$) equidistant from central axes (31y, 32y, and 33y) of the columnar iron cores (31, 32, and 33). The other structure of the three-phase transformer 104 according to the fourth embodiment is the same as that of the three-phase transformer 101 according to the first embodiment, so a detailed description thereof is omitted.

According to the arrangement of the columnar iron cores (31, 32, and 33) having the primary coils (41a, 42a, and 43a) wound thereon and the shape of the first plate iron core 1 and the second plate iron core 2, the rod member 6 is preferably disposed such that its central axis coincides with the axis (rotation axis $C_1$) equidistant from the central axes (31y, 32y, and 33y) of the columnar iron cores (31, 32, and 33). The rod member 6 is preferably made of a magnetic material or a conductive material.

In transformers, when gaps are formed in the columnar iron cores (31, 32, and 33), large suction force is produced in the gaps. Therefore, by supporting the centers of the first plate iron core 1 and the second plate iron core 2, it is possible to effectively prevent distortion in the first plate iron core 1 and the second plate iron core 2. Since the suction force is exerted only in the direction of attracting opposite columnar iron core portions across the gap, distortion (leading to variations in the gaps) can be effectively reduced against the direction of a load.

In the example of FIG. 11, the cover 5 and the rod member 6 are provided in the three-phase transformer 104, but only the rod member 6, without the cover 5, may be provided instead. In this case, the first plate iron core 1 and the second plate iron core 2 may be directly secured by screwing, etc.

Furthermore, in the three-phase transformer shown in FIG. 5, a securing assistant rod member (not shown) may be provided such that its central axis coincides with an axis equidistant from central axes of the first columnar iron core portions (31a, 32a, and 33a). The rod member is preferably made of a magnetic material or a conductive material. The provision of the rod member can improve stability, when the first plate iron core 1 is rotated relative to the second plate iron core 2.

In the three-phase transformer according to the present embodiment, at least one of the first plate iron core 1, the second plate iron core 2, the columnar iron cores (31, 32, and 33), and the rod member 6 may be made from a winding core. Furthermore, a rod-shaped central core may be disposed at the center of the winding core. Using the winding core contributes to reductions in magnetizing current and iron loss.

In the three-phase transformer shown in FIG. 5, at least one of the first plate iron core 1, the second plate iron core 2, the first columnar iron core portions (31a, 32a, and 33a), the second columnar iron core portions (31b, 32b, and 33b), and the rod member (not shown) is preferably made from a winding core. Furthermore, a rod-shaped central core may be disposed at the center of the winding core. Using the winding core contributes to reductions in magnetizing current and iron loss.

Figure 12:
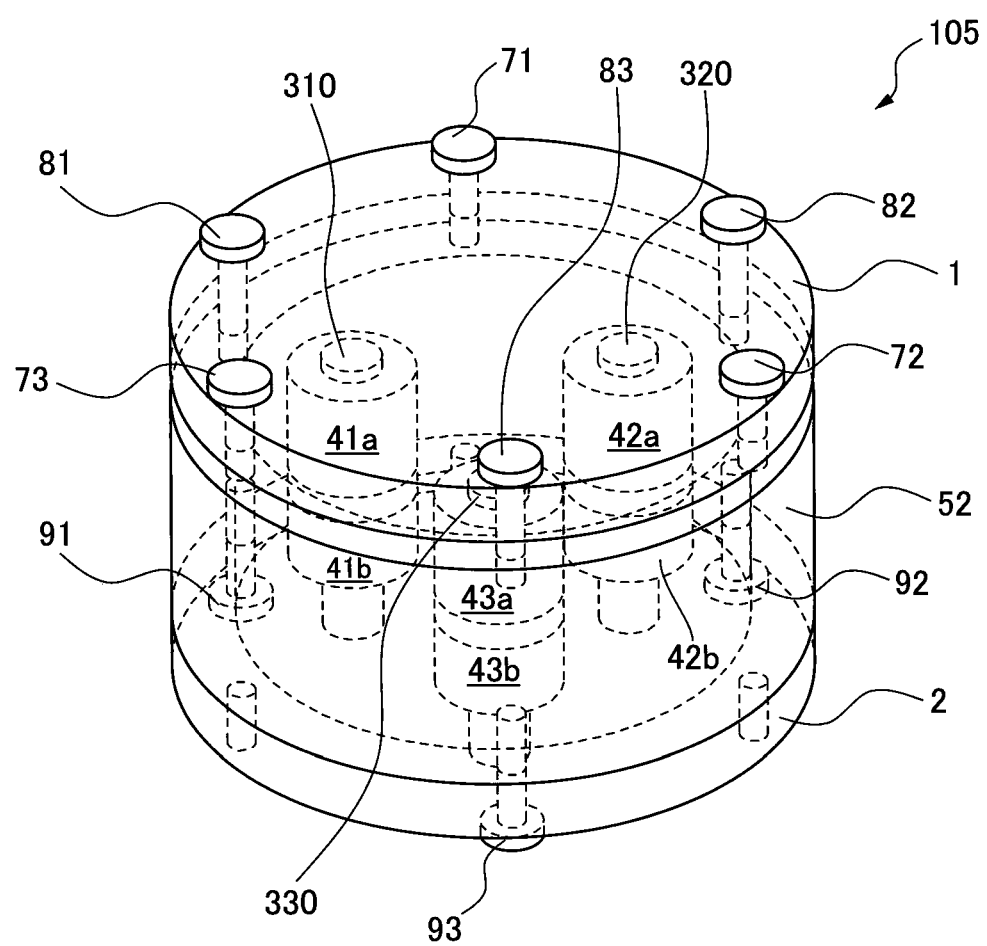
FIG. 12 is a perspective view of a three-phase transformer according to a fifth embodiment.
Figure 13:
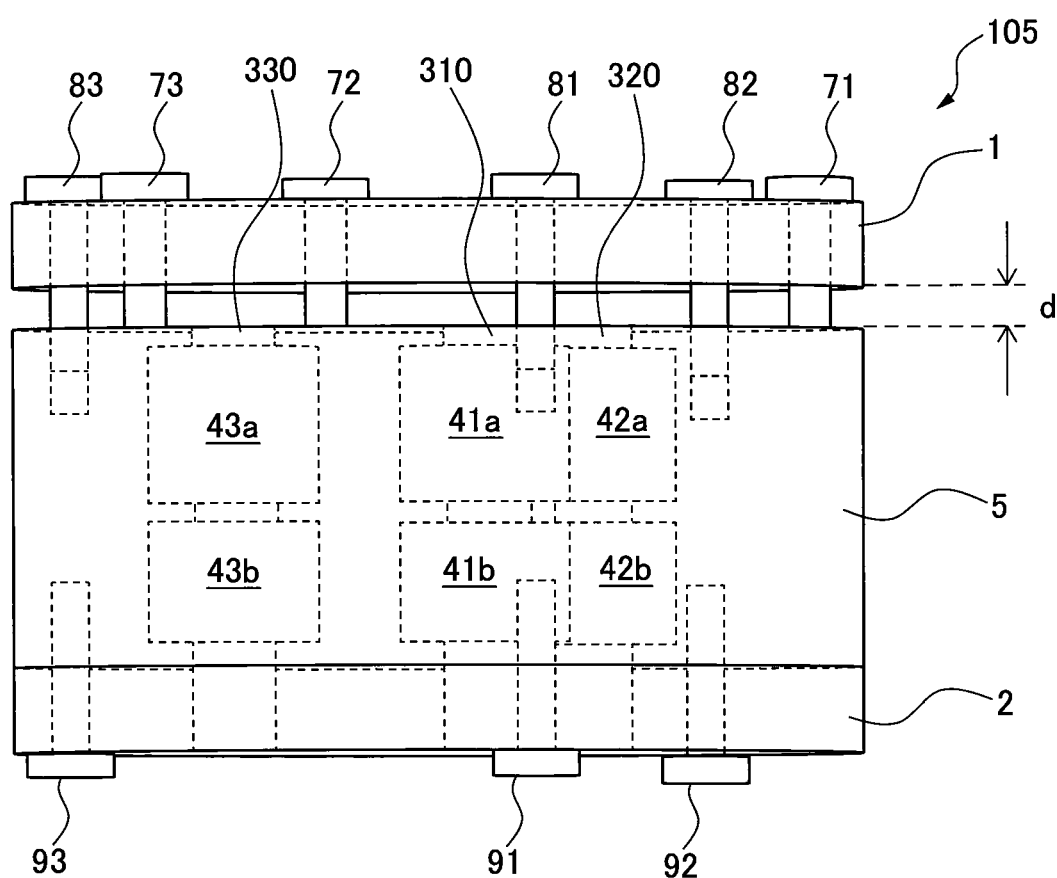
FIG. 13 is a side view of the three-phase transformer according to the fifth embodiment.

Next, a three-phase transformer according to a fifth embodiment will be described. FIG. 12 is a perspective view of the three-phase transformer according to the fifth embodiment. FIG. 13 is a side view of the three-phase transformer according to the fifth embodiment. The difference between a three-phase transformer 105 according to the fifth embodiment and the three-phase transformer 101 according to the first embodiment is that a second gap is formed between at least one of a first plate iron core 1 and a second plate iron core 2 and at least one of columnar iron cores (310, 320, and 330), and a gap adjustment mechanism (71, 72, and 73) is provided to adjust the length d of the second gap. The other structure of the three-phase transformer 105 according to the fifth embodiment is the same as that of the three-phase transformer 101 according to the first embodiment, so a detailed description thereof is omitted.

As the gap adjustment mechanism (71, 72, and 73), screws provided in the first plate iron core 1 may be used. Tip end surfaces of the screws contact a cover 5, and screw holes are formed in the first plate iron core 1. By turning the screws (71, 72, and 73) constituting the gap adjustment mechanism, the first plate iron core 1 can be moved up and down. A second gap d can be formed between the first plate iron core 1 and tip ends of the columnar iron cores (310, 320, and 330), and the size of the second gap d can be adjusted by the screws. The "second gap" refers to a gap formed between the first plate iron core 1 or the second plate iron core 2 and the tip ends of the columnar iron cores (310, 320, and 330). Adjustment of the size of the second gap d allows adjustment of the amount of inductance. Accordingly, the single transformer can form the inductance of different amounts.

As described above, the first plate iron core 1 can be secured only by the screws (71, 72, and 73) constituting the gap adjustment mechanism. However, against magnetic suction force exerted on the second gap d, threads may be cut on the cover 5, and holes having threads may be formed in the first plate iron core 1. First securing screws (81, 82, and 83) may secure the first plate iron core 1 and the cover 5 to strengthen coupling. On the other hand, second securing screws (91, 92, and 93) may secure the second plate iron core 2 and the cover 5 to strengthen coupling.

As a gap adjustment mechanism other than the screws, a member such as a spacer may be sandwiched between the first plate iron core 1 and the cover 5, and a gap may be formed using securing screws.

The example of FIGS. 12 and 13 is provided with the cover 5. However, when the cover 5 is not provided, the screws (71, 72, and 73) functioning as the gap adjustment mechanism and the securing screws (81, 82, and 83) may be threaded to the second plate iron core 2, thus allowing adjustment of a gap, just as described above.

Figure 14:
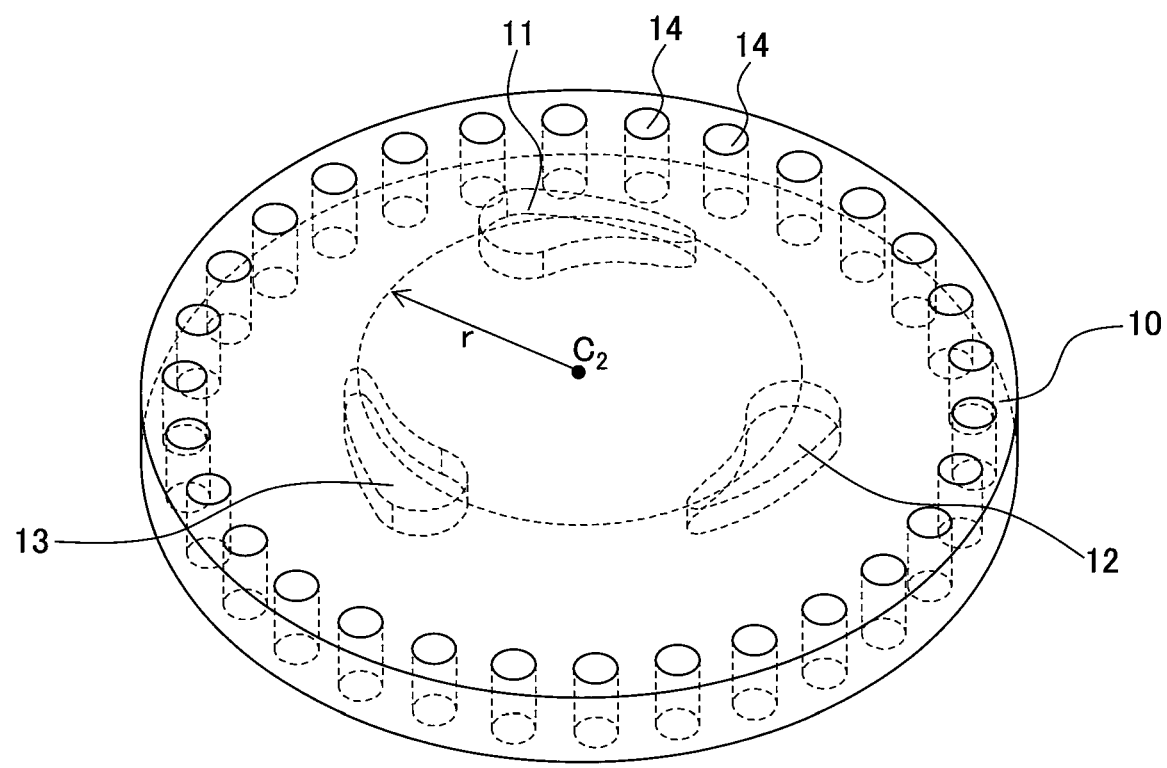
FIG. 14 is a perspective view of a first plate iron core constituting a three-phase transformer according to a modification example of the fifth embodiment.

FIG. 14 is a perspective view of a first plate iron core 10 constituting a three-phase transformer according to a modification example of the fifth embodiment. As a gap adjustment mechanism instead of the screws, protrusions (11, 12, and 13) as shown in FIG. 14 are provided in an opposite surface of the first plate iron core 10 to columnar iron cores (not illustrated). The protrusions (11, 12, and 13) are arranged along a circle at a distance r from a rotation center $C_2$ of the first plate iron core 10, such that the length of each protrusion in a radial direction is reduced clockwise. A plurality of screw holes 14 are formed in the first plate iron core 10 to adjust the position of the first plate iron core 10 in a circumferential direction. By rotating the first plate iron core 10, a contact area between the columnar iron core and the protrusion (11, 12, or 13) of the first plate iron core 10 is intentionally varied, in order to adjust the amount of inductance.

Figure 15:
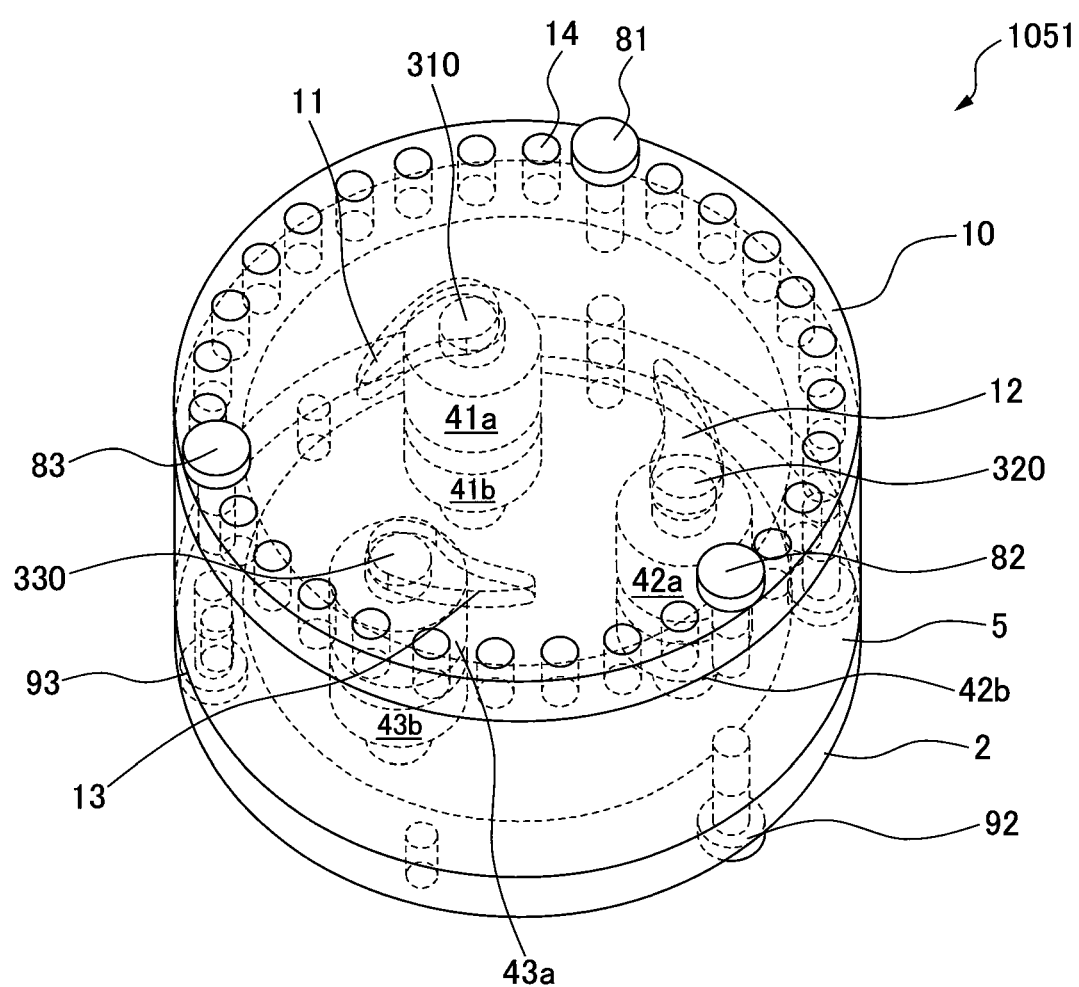
FIG. 15 is a perspective view of the three-phase transformer according to the modification example of the fifth embodiment, in a state of having a high inductance.

FIG. 15 is a perspective view of a three-phase transformer 1051 according to the modification example of the fifth embodiment, in a state of having a high inductance. The protrusions (11, 12, and 13) contact the columnar iron cores (310, 320, and 330) at positions having a maximum length in the radial direction. The inductance is maximized in this state.

Figure 16:
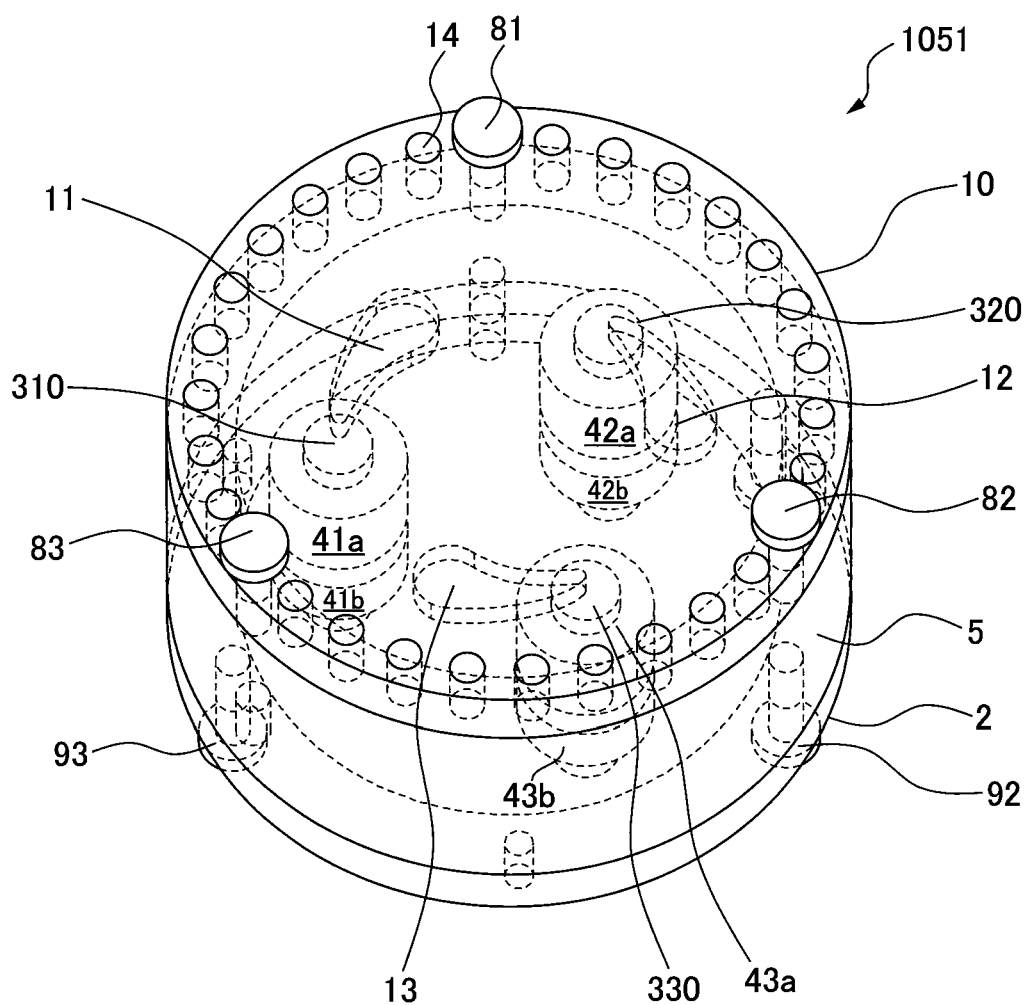
FIG. 16 is a perspective view of the three-phase transformer according to the modification example of the fifth embodiment, in a state of having a low inductance.

FIG. 16 is a perspective view of the three-phase transformer 1051 according to the modification example of the fifth embodiment, in a state of having a low inductance. The protrusions (11, 12, and 13) contact the columnar iron cores (310, 320, and 330) at positions having a minimum length in the radial direction. The inductance is minimized in this state.

In the structure shown in FIGS. 15 and 16, to make an airtight structure inside the three-phase transformer 1051 enclosed by the first plate iron core 10, the cover 5, and the second plate iron core 2, clearance may be clogged by a member. The airtight structure can take measures against leakage flux, electromagnetic waves, dust particles, etc.

Next, a three-phase transformer according to a sixth embodiment will be described. The difference between the three-phase transformer according to the sixth embodiment and the three-phase transformer 103 according to the third embodiment is that a portion enclosed by a first plate iron core 1, a second plate iron core 2, and a cover 5 is filled with an insulating oil or a magnetic fluid. The other structure of the three-phase transformer according to the sixth embodiment is the same as that of the three-phase transformer 103 according to the third embodiment, so a detailed description thereof is omitted.

As shown in FIG. 9, a portion enclosed by the first plate iron core 1, the second plate iron core 2, and the cover 5 is filled with an insulating oil or a magnetic fluid. For example, after the cover 5 is provided on the second plate iron core 2, the insulating oil or the magnetic fluid is poured, and then the first plate iron core 1 is provided on the cover 5. In the case of using the magnetic fluid, a magnetic field generated by coils, etc., in the cover 5 has the effect of stirring the magnetic fluid. A heat generation source includes the primary coils (41a, 42a, and 43a), the secondary coils (41b, 42b, and 43b), and the columnar iron cores (31, 32, and 33) on which the primary coils and the secondary coils are wound. Owing to convection of the insulating oil or the magnetic fluid, heat is exchanged with outside by heat conduction, so the primary coils, the secondary coils, and the columnar iron cores can be cooled.

Figure 17:
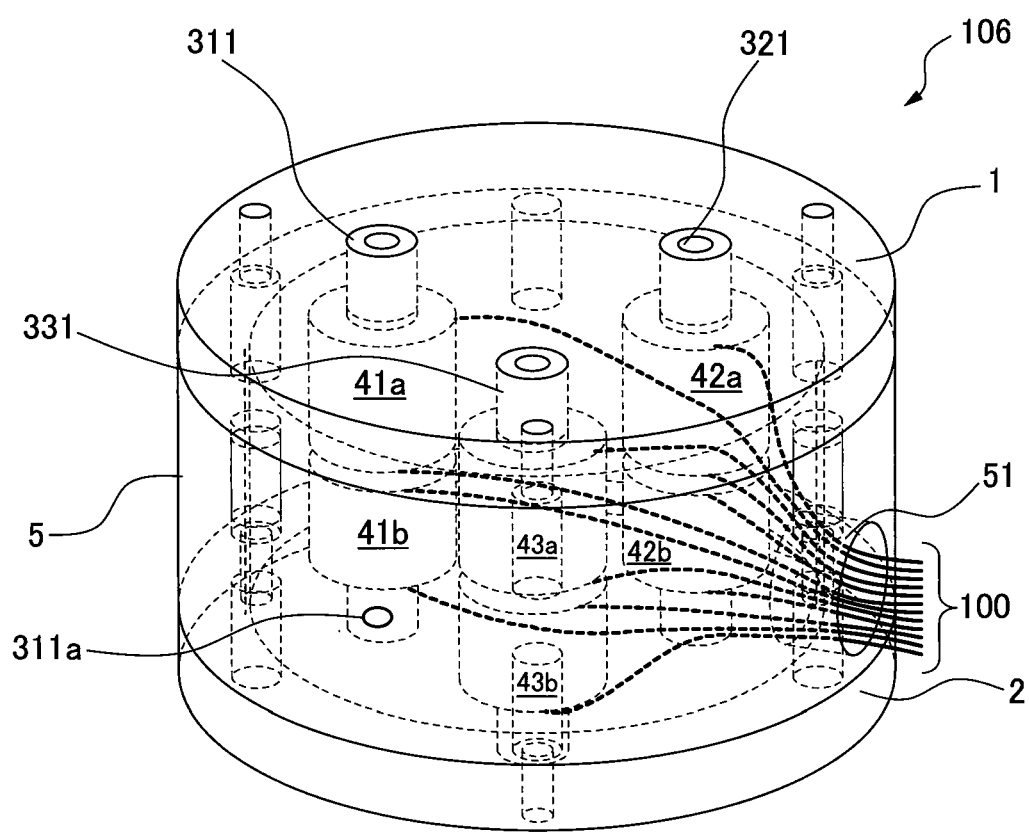
FIG. 17 is a perspective view of a three-phase transformer according to a seventh embodiment.

Next, a three-phase transformer according to a seventh embodiment will be described. FIG. 17 is a perspective view of a three-phase transformer 106 according to the seventh embodiment. The difference between the three-phase transformer 106 according to the seventh embodiment and the three-phase transformer 103 according to the third embodiment is that a plurality of columnar iron cores (311, 321, and 331) have air core structures and an opening 311a. An insulating oil or a magnetic fluid is circulated in a portion enclosed by the first plate iron core 1, the second plate iron core 2, and the cover 5 through the air core structures and the opening 311a. The other structure of the three-phase transformer 106 according to the seventh embodiment is the same as that of the three-phase transformer 103 according to the third embodiment, so a detailed description thereof is omitted.

The columnar iron cores (311, 321, and 331) penetrate through the first plate iron core 1 and the second plate iron core 2, and the air core structures are led into the outside of the first plate iron core 1 and the second plate iron core 2. Therefore, the insulating oil or the magnetic fluid can flow into the air core structures from the side of the first plate iron core 1 and can be ejected from the side of the second plate iron core 2.

Cooling water or cooling oil may flow into the air core structures of the columnar iron cores (311, 321, and 331). This structure can improve the cooling performance of the three-phase transformer 106.

Furthermore, the columnar iron cores (311, 321, and 331) may have the air core structures and the opening 311a, and an insulating oil or a magnetic fluid may be circulated in the portion enclosed by the first plate iron core 1, the second plate iron core 2, and the cover 5 through the air core structures and the opening 311a. To efficiently cool the primary coils (41a, 42a, and 43a), the secondary coils (41b, 42b, and 43b), and the columnar iron cores (31, 32, and 33) on which the primary coils and the secondary coils are wound, the insulating oil or the magnetic fluid that is heated during the circulation may be ejected to the outside of the three-phase transformer and returned after being cooled. In the example of FIG. 17, the opening 311a is formed in the single columnar iron core 311. However, a plurality of openings may be formed in one of the columnar iron cores, or one or a plurality of openings may be formed in the columnar iron cores.

Figure 18:
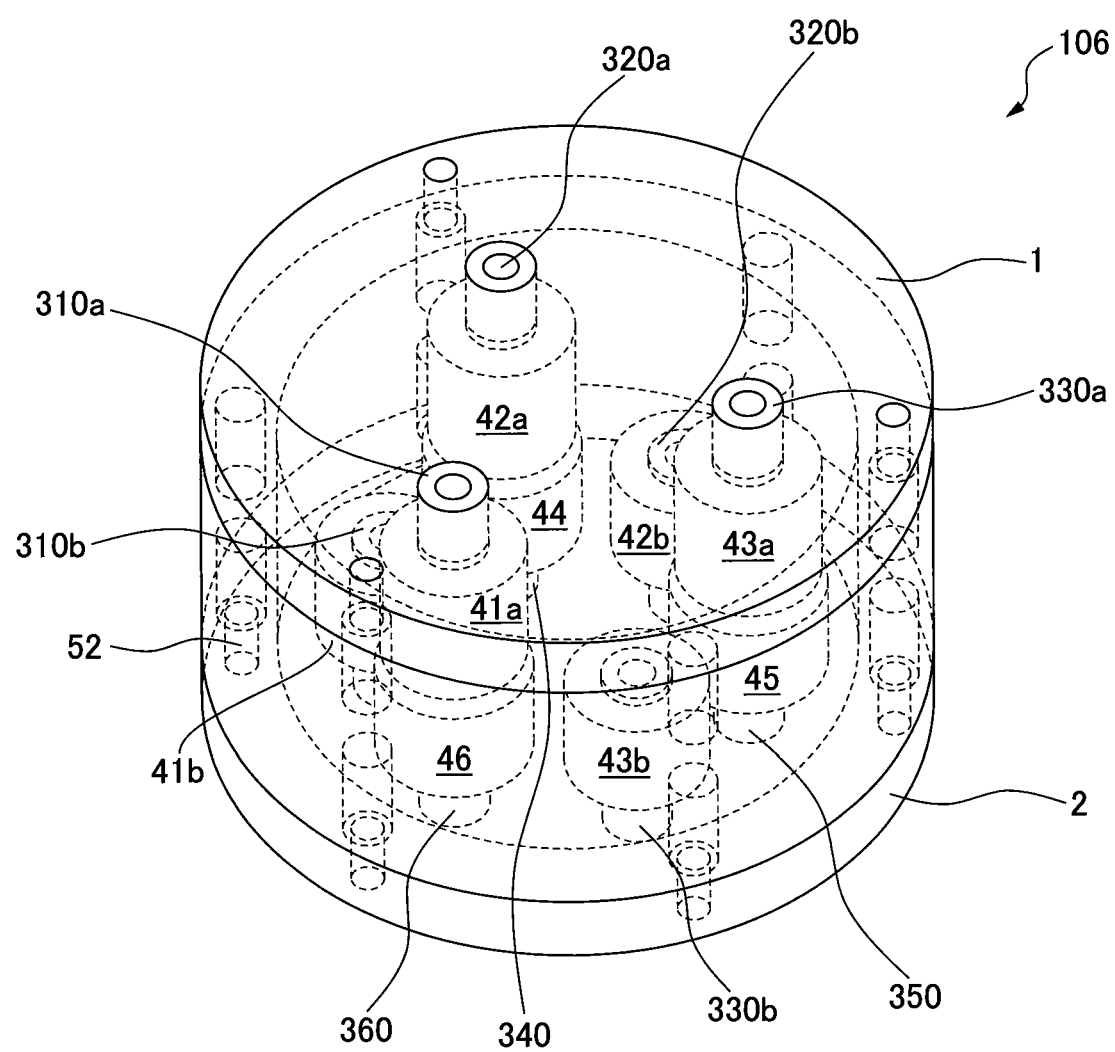
FIG. 18 is a perspective view of a three-phase transformer according to a modification example of the seventh embodiment.

FIG. 18 is a perspective view of a three-phase transformer according to a modification example of the seventh embodiment. Each of a plurality of first columnar iron core portions (310a, 320a, and 330a), a plurality of second columnar iron core portions (310b, 320b, and 330b), and a plurality of third columnar iron core portions (340, 350, and 360) may have an air core structure. An insulating oil or a magnetic fluid may be circulated through the air core structures in a portion enclosed by a first plate iron core 1, a second plate iron core 2, and a cover 5.

FIG. 17 also shows wires 100 of the coils wound on the columnar iron cores (311, 321, and 331). A connection portion 51 for taking the wires 100 out of the three-phase transformer 106 is preferably provided in a position having no effect on magnetic flux. In an airtight structure, a connector, a rubber packing, an adhesive, etc., is used in the connection portion 51 to keep airtightness. The connection portion 51 may be disposed in any position, as long as the connection portion 51 has no effect on magnetic flux, i.e., inductance.

According to the three-phase transformers of the embodiments, it is possible to provide a three-phase transformer in which three phases are balanced, and that achieves less leakage flux and higher efficiency.

What is claimed is:

1. A three-phase transformer comprising:
   a first plate iron core and a second plate iron core disposed opposite each other;
   a plurality of columnar iron cores disposed between the first plate iron core and the second plate iron core so as to be connected to the first plate iron core or the second plate iron core, the number of the columnar iron cores being an integer multiple of 3, the columnar iron cores being disposed rotation-symmetrically with respect to an axis serving as a rotation axis equidistant from central axes of the columnar iron cores; and
   coils including a plurality of primary coils and a plurality of secondary coils A, the number of the primary coils being an integer multiple of 3, the number of the secondary coils A being an integer multiple of 3, the primary coils and the secondary coils A being wound on the individual columnar iron cores, wherein
   each of the columnar iron cores is separated into a first columnar iron core portion on which the primary coil is wound, and a second columnar iron core portion on which the secondary coil A is wound,
   the second plate iron core has a plurality of third columnar iron core portions and a plurality of secondary coils B wound on the individual third columnar iron core portions, and the secondary coil B has a different winding number from the secondary coil A, and the number of the plurality of third columnar iron core portions is the same as the number of the plurality of column iron cores, and
   the first plate iron core or the second plate iron core is rotatable about the rotation axis, so as to selectively switch between a combination of the primary coils and the secondary coils A and a combination of the primary coils and the secondary coils B.

2. The three-phase transformer according to claim 1, further comprising a cover disposed on outer peripheries of the first plate iron core and the second plate iron core, so as to enclose the first columnar iron core portions, the second columnar iron core portions, the third columnar iron core portions, the primary coils, the secondary coils A, and the secondary coils B.

3. The three-phase transformer according to claim 2, wherein the cover is made of a magnetic material or a conductive material.

4. The three-phase transformer according to claim 2, wherein at least one of the first plate iron core, the second plate iron core, the columnar iron cores, and the cover is made from a winding core.

5. The three-phase transformer according to claim 1, further comprising a securing assistant rod member the central axis of which coincides with the axis equidistant from the central axes of the columnar iron cores.

6. The three-phase transformer according to claim 5, wherein the rod member is made of a magnetic material or a conductive material.

7. The three-phase transformer according to claim 5, wherein at least one of the first plate iron core, the second plate iron core, the columnar iron cores, and the rod member is made from a winding core.

8. The three-phase transformer according to claim 7, wherein a rod-shaped central core is disposed at the center of the winding core.

9. The three-phase transformer according to claim 2, wherein a portion enclosed by the first plate iron core, the second plate iron core, and the cover is filled with an insulating oil or a magnetic fluid.

10. The three-phase transformer according to claim 2, wherein the columnar iron cores have an air core structure and an opening, and an insulating oil or a magnetic fluid is circulated through the air core structure and the opening in a portion enclosed by the first plate iron core, the second plate iron core, and the cover.

* * * * *